United States Patent [19]

Scheffel et al.

[11] Patent Number: 5,285,878

[45] Date of Patent: Feb. 15, 1994

[54] CYLINDER INCLUDING A PISTON WITH A VALVE CONTROL

[75] Inventors: Martin Scheffel, Vaihingen-Enzweihingen; Kurt Engelsdorf, Besigheim; Roland Weisser, Unterkirnach, all of Fed. Rep. of Germany

[73] Assignee: Robert Bosch GmbH, Stuttgart, Fed. Rep. of Germany

[21] Appl. No.: 806,385

[22] Filed: Dec. 13, 1991

[30] Foreign Application Priority Data

Dec. 22, 1990 [DE] Fed. Rep. of Germany ....... 4041619

[51] Int. Cl.$^5$ ................................................. F16F 9/44
[52] U.S. Cl. ........................................ 188/319; 188/299
[58] Field of Search .............. 188/280, 282, 299, 319, 188/322.13, 322.14, 322.15; 137/493.7, 509, 513; 280/714

[56] References Cited

U.S. PATENT DOCUMENTS

| | | | |
|---|---|---|---|
| 2,744,469 | 5/1956 | Schaeffer | 137/513 |
| 3,542,212 | 11/1970 | Daugherty, Jr. | 188/280 |
| 3,568,711 | 3/1971 | Katz | 188/280 |
| 4,819,771 | 4/1989 | Britze | 188/319 |
| 4,854,429 | 8/1989 | Casey | 188/319 |
| 4,893,699 | 1/1990 | Engelsdorf et al. | 188/299 |
| 4,905,798 | 3/1990 | Engelsdorf et al. | 188/299 |
| 4,958,704 | 9/1990 | Leiber et al. | 188/285 |
| 5,137,125 | 8/1992 | Troltsch et al. | 188/299 |

FOREIGN PATENT DOCUMENTS

| | | | |
|---|---|---|---|
| 0285909 | 10/1988 | European Pat. Off. | |
| 0288736 | 11/1988 | European Pat. Off. | |
| 0399326 | 11/1990 | European Pat. Off. | 188/299 |
| 462947 | 5/1975 | U.S.S.R. | 188/280 |

Primary Examiner—Robert J. Oberleitner
Assistant Examiner—Chris Schwartz
Attorney, Agent, or Firm—Edwin E. Greigg; Ronald E. Greigg

[57] ABSTRACT

In previously known shock absorbers, a throttle cross section can be controlled with the aid of a control slide. Because flow forces can never be avoided entirely, the magnetic force must be controlled as a function of the flowing pressure fluid flow. In the cylinder proposed here, having a control slide, an additional force acting upon the control slide results, which is directed counter to these flow forces and can at least partially compensate for them. The proposed cylinder is intended in particular for use as a shock absorber for vehicles.

8 Claims, 4 Drawing Sheets

CYLINDER INCLUDING A PISTON WITH A VALVE CONTROL

BACKGROUND OF THE INVENTION

The invention is based on a cylinder as including a flow control valve for controlling fluid flow between an upper chamber and a lower chamber.

A cylinder with two work chambers and a flow connection connecting the two work chambers is already known. In the course of the flow connection, there is a throttle cross section the free cross-sectional area of which is variable with the aid of an electromagnetically actuatable control slide.

If the control slide is in an approximately middle position, for instance, and if the quantity of pressure fluid flowing through it per unit of time varies, then a flow force acting upon the control slide varies as well. The quantity of pressure fluid flowing through per unit of time will hereinafter be called the pressure fluid flow. At a constant control slide position, the pressure fluid flow depends on a pressure difference between the pressures in the two work chambers.

European Patent Applications A1 0 285 909 and A1 0 288 736 show a cylinder with a control slide that is embodied such that the flow forces acting upon the control slide, although small, are nevertheless still present. Despite a clever embodiment of the control slide, the pressure fluid flow produces a flow force urging the control slide in the closing direction. As a result, depending on the magnitude of the pressure fluid flow, the control slide tends to reduce the throttle cross-sectional area somewhat. In the aforementioned applications, this can be compensated for electrically with the aid of a control circuit containing a position transducer.

OBJECT AND SUMMARY OF THE INVENTION

By comparison, the cylinder equipped in accordance with provisions set forth herein have the advantage that the flow force acting upon the control slide is completely or at least partially compensated for by an additional force acting on the control slide in the contrary direction. The control of the control slide can thus advantageously be achieved even without an electronic control circuit, or else the control circuit, if present, can advantageously be embodied more simply. The area of the throttle cross section is independent, or largely independent, of the magnitude of the pressure fluid flow flowing through it, despite the fact that major electrical expense is not undergone.

The valve assembly provided has the advantage that the cylinder can be embodied in such a way that with a contrary flow direction of the pressure fluid through the throttle cross section, the production of the additional force does not occur.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
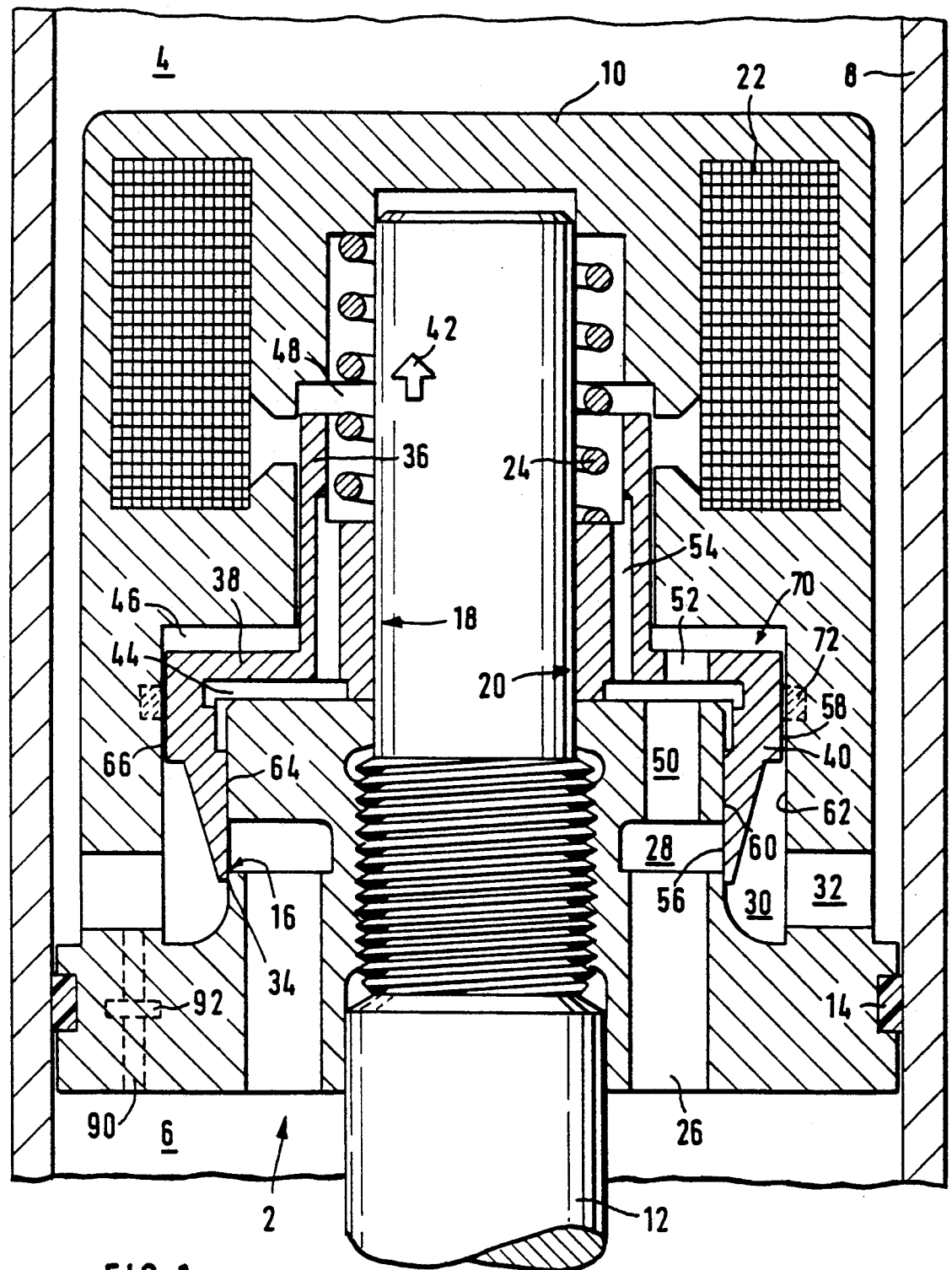
FIGS. 1-4 each show a different exemplary embodiment of the cylinder.

The drawing shows the cylinder in only fragmentary form, for the sake of simplicity. Only the region of a flow connection 2 between a first work chamber 4 and a second work chamber 6 is shown. The work chambers 4, 6 are shown only in part and are located inside a jacket tube 8, likewise shown only in part.

In the exemplary embodiment shown, the flow connection 2 leads through a piston 10. However, the flow connection 2 may be provided instead at any other point in the region of the cylinder. In the exemplary embodiment shown both work chambers 4, 6 are located inside the jacket tube 8. However, it is also possible for at least one of the two work chambers 4, 6 to be located outside the jacket tube 8. At least one of the work chambers 4, 6 may for instance be a compensation chamber. The compensation chamber may for instance surround the jacket tube 8, or it may be embodied as a separate reservoir.

The work chambers 4, 6 contain a pressure fluid. The pressure fluid may be in liquid or gaseous form, for example. It is also possible for at least one of the work chambers 4, 6 to be filled only in part with the pressure fluid, which for instance is liquid, while the rest of the work chamber contains a gas.

The piston 10 is secured to a piston rod 12. With the interposition of a seal 14, the piston 10 can slide axially on an inner jacket face of the jacket tube 8.

A throttle cross section 16 having a throttle cross-sectional area is located in the course of the flow connection 2. The size of the area of the throttle cross section 16 can be varied with the aid of a control device 18.

The control device 18 includes a stepped cylindrical control slide 20, an electromagnet 22 and a spring 24.

The flow connection includes axial openings 26, a cylindrical groove recess 28, a control chamber 30 and radial openings 32.

In the exemplary embodiment shown in FIG. 1, the first work chamber 4 is located above the piston 10, and the second work chamber 6 is located below the piston 10. Beginning at the second work chamber 6, the flow connection extends through the axial opening 26, the groove recess 28, the throttle cross section 16, the control chamber 30, and finally the radial openings 32, into the first work chamber 4.

The control device 18 having the stepped cylindrical control slide 20, the electromagnet 22 and the spring 24 may be embodied as described in European Patent Applications A1 0 285 909 and A1 0 288 736, or U.S. Pat. Nos. 4,905,798 and 4,893,699, for example. To avoid repetition, reference is made to what is described and shown there. In particular, the control slide 20, as described and shown there, may for instance be provided with protrusions and indentations extending in the actuation direction, and may be embodied in the form of a cutting edge in the region of its slide control edge 34.

Despite this known and intrinsically already advantageous embodiment of the control slide, flow forces act upon the control slide 20 in its actuation direction if pressure fluid is flowing through the throttle cross section 16.

The novel cylinder of the invention is embodied such that an additional force at least partly compensates for the flow force acting upon the control slide 20.

The control slide 20 includes an armature 36, an annular slide 38, and a slide part 40. An axial through bore is provided in the armature 36, by means of which bore the control slide 20 is displaceable to slide axially on the piston rod 12. In the region of the radially outwardly extending annular disk 38, the armature 36 merges with the slide part 40.

With increasing power to the electromagnet 22, the control slide 20 moves counter to the spring 24. In the drawing, this direction is represented by an arrow 42.

The control slide 20 is located inside the piston 10. With motion of the control slide 20 in direction of the arrow 42, a first chamber 44 between the annular slide 38 and the piston 10 enlarges. A second chamber 46 on the other side of the annular slide 38 shrinks to the same extent, and a third chamber 48, in which the spring 24 is located, also shrinks. The first chamber 44 communicates via an opening 50 with the groove recess 28 and thus with the second work chamber 6. An opening 52 provided in the annular disk 38 of the control slide 20 joins the two chambers 44, 46 to one another. A further opening 54 joins the third chamber 48 to the first chamber 44. The chambers 44, 46, 48 communicate with the second work chamber 6 via the openings 50, 52, 54.

The throttle cross section 16 is formed in cooperation between the slide control edge 34 and the groove recess 28. By displacing the control slide 20 parallel to the arrow 42, the area of the throttle cross section 16 can be varied.

The slide part 40 of the control slide 20 has a cylindrical inner jacket face 56 and a cylindrical outer jacket face 58. The piston 10 has a cylindrical inner jacket face 60 and a cylindrical outer jacket face 62. The groove recess 28 interrupts the inner jacket face 60. Upon actuation of the control slide, the inner jacket face 56 of the control slide 20 moves along the inner jacket face 60 of the piston 10, and the outer jacket face 58 of the control slide 20 moves along the outer jacket face 62 of the piston 10. An inner gap 64 is formed between the inner jacket faces 56 60. An outer gap 66 is formed between the outer jacket faces 58, 62. The inner gap 64 intrinsically joins the first chamber 44 to the groove recess 28 and to the control chamber 30. However, the inner gap 64 is so small that there is virtually no communication via the gap 64 between the first chamber 44 and the groove recess 28 and control chamber 30. The outer gap 66 intrinsically joins the second chamber 46 to the control chamber 30. However, the outer gap 66 is embodied as so thin that the second chamber 46 can be considered to be separate from the control chamber 30.

The outer jacket faces 58, 62 and thus the outer gap 66 have larger diameters than the inner jacket faces 56, 60 and inner gap 64, respectively. A cross-sectional area between the outer jacket faces 58, 62 and the inner jacket faces 56, 60 and between the outer gap 66 and the inner ga 64 forms an effective face 70.

For the case where the pressure in the first work chamber 4 is greater than in the second work chamber 6, the pressure fluid flows out of the first work chamber 4 through the flow connection 2, that is, through the free area of the throttle cross section 16, into the second work chamber 6. The pressure of the inflowing pressure fluid in the control chamber 30 is virtually equal to the pressure of the pressure fluid in the first work chamber 4. The pressure of the pressure fluid flowing out of the throttle cross section 16 in the groove recess 28 is virtually equal to the pressure in the second work chamber 6. The pressure of the inflowing pressure fluid in the control chamber 30 is greater than the pressure of the outflowing pressure fluid in the groove recess 28. The difference between the pressure of the inflowing pressure fluid and the pressure of the outflowing pressure fluid is reduced in the region of the throttle cross section 16.

If there is a flow of pressure fluid through the throttle cross section 16, then hydrodynamic or hydrostatic flow forces act upon the control slide 20. A flow force resulting from the flow forces acts upon the control slide 20 counter to the direction of the arrow 42 in the exemplary embodiment shown, that is, in the direction that closes the throttle cross section 16. The higher pressure in the control chamber 30 acts upon the effective face 70 in the direction of the arrow 42. The lower pressure of the outflowing pressure fluid acts in the second chamber 46 upon the effective face 70 of the control slide 20, counter to the arrow 42. Since the pressure in the control chamber 30 is greater than the pressure in the second chamber 46, there is a resultant additional force upon the control slide 20 in the direction of the arrow 42. This resultant additional force is in the opposite direction from the resultant flow force acting upon the control slide 20 and can accordingly at least partially compensate for the resultant flow force. By a suitable selection of the diameters of the jacket faces 56, 58, 60, 62, or in other words by suitable dimensioning of the effective face 70, the magnitude of the additional force can be selected as needed.

With an increasing pressure difference between the pressures in the work chambers 4, 6 or in the control chamber 30 and in the groove recess 28, and with an equal throttle cross-sectional area, the flow of pressure fluid through the throttle cross section 16 increases. However, the flow force acting upon the control slide 20 then increases as well. With an increasing pressure difference, however, the additional force likewise acting upon the control slide 20 also increases. Since the additional force is contrary to the flow force, the two forces can largely cancel one another out, largely independently of the pressure difference between the two work chambers 4, 6 or of the magnitude of the flow of pressure fluid.

To preclude seizing between the control slide 20 and the piston 10, it is suitable not to make the outer gap 66 overly small. To achieve adequate separation of the second chamber 46 from the control chamber 30 the outer gap 66 can optionally be additionally sealed off with the aid of an encompassing elastic seal 72. The seal 72 is not absolutely necessary and has therefore been shown in dashed lines in FIG. 1. The inner gap 64 can likewise be sealed off as needed with the aid of an additional seal, not shown.

Figure 2:
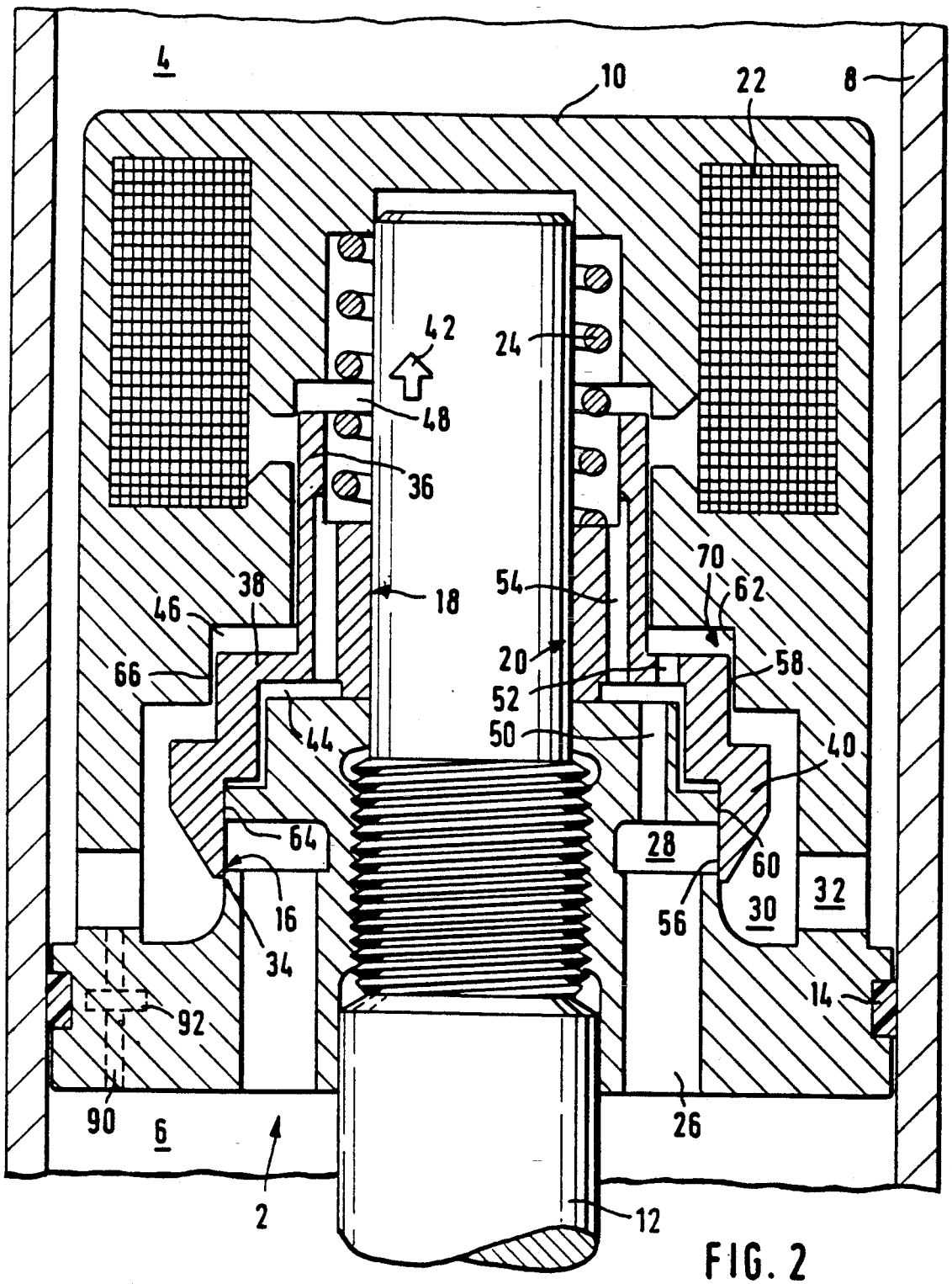

FIG. 2 shows a second exemplary embodiment. In all the drawing figures, elements that are the same or function the same are provided with the same reference numerals. Both the second exemplary embodiment and the following exemplary embodiments have largely the same structure as the first exemplary embodiment, except for the differences essentially described below.

In FIG. 2, the slide part 40 of the control slide 20 is embodied in angled form. Other details for embodying the control slide 20 can be found in the drawing. It is thus possible to make the difference between the diameters of the outer gap 66 and inner gap 64 rather small, without having to make the slide part 40 overly thin. It is thus possible for the effective face 70 to be quite small, without causing problems in terms of strength of the slide part 40 of the control slide 20.

Figure 3:
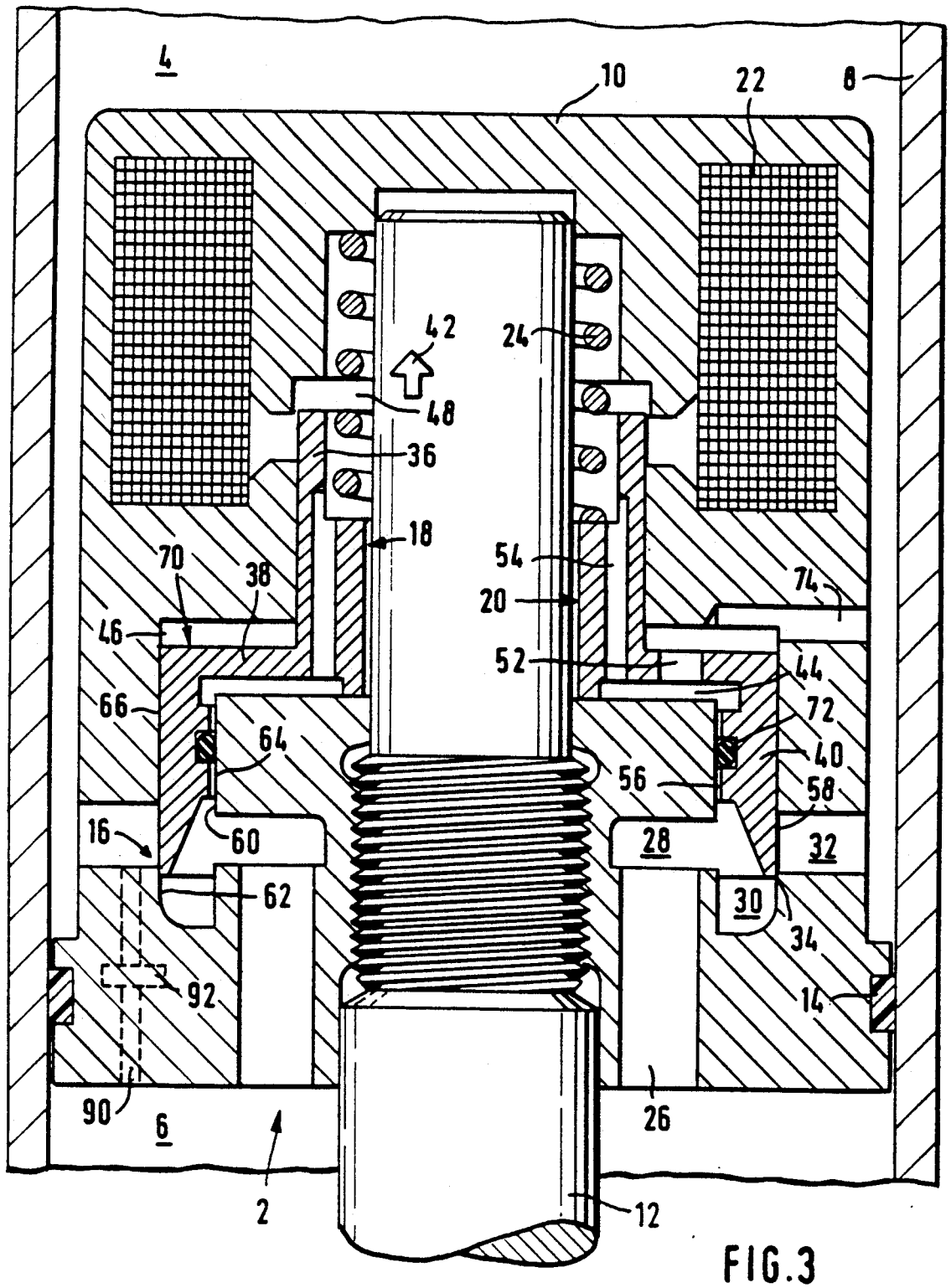

The third exemplary embodiment is shown in FIG. 3.

In FIGS. 1 and 2, the throttle cross section 16 is formed in cooperation between the inner jacket face 56 of the control slide 20 and the inner jacket face 60 of the piston 10. In the third exemplary embodiment shown in FIG. 3, the throttle cross section is formed in cooperation between the control slide 20 and the piston 10 in the region of the outer jacket faces 58, 62.

The exemplary embodiment shown in FIG. 3 omits the opening 50. An opening 74 is provided instead. Hence the first chamber 44, second chamber 46 and third chamber 48 communicate with the first work chamber 4 via opening 74.

The exemplary embodiment shown in FIG. 3 has the same mode of operation, when the pressure fluid is flowing out of the second work chamber 6 into the first work chamber 4, as has been described for the first exemplary embodiment shown in FIG. 1 in the situation when the pressure fluid is flowing out of the first work chamber 4 into the second work chamber 6.

The exemplary embodiments shown in FIGS. 1-3 are especially suitable if the pressure fluid has to flow through the flow connection 2 in only one direction. This may be the case in so-called double-tube shock absorbers, for instance. In that case, during the retraction stroke, for instance, the pressure fluid is carried through the flow connection 2 that in this case is provided in the piston 10 and is controlled accordingly there. If the pressure fluid is to be carried through the flow connection 2 with an alternating flow direction, then it is especially suitable to embody the cylinder in accordance with the exemplary embodiment of FIG. 4.

Figure 4:
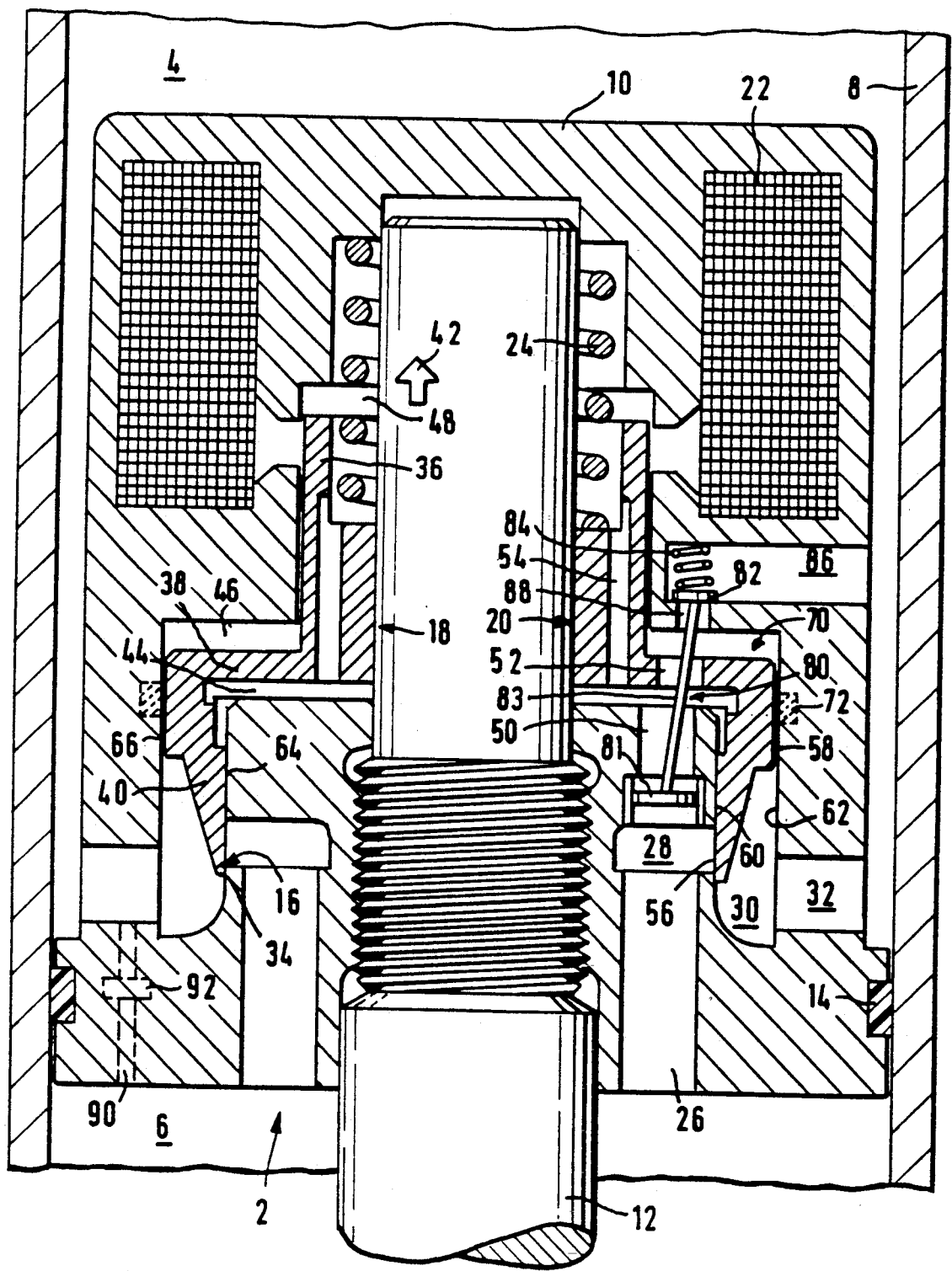

FIG. 4 shows the fourth exemplary embodiment.

The fourth exemplary embodiment is largely the same in structure as the first exemplary embodiment of FIG. 1, except that a valve assembly 80 is additionally provided. The valve assembly 80 essentially includes a first valve body 81, a second valve body 82, a connection 83 and a spring 84, for instance. FIG. 4 shows an especially advantageous embodiment of the valve assembly 80, by way of example.

A chamber 86 communicating with the work chamber 4 is provided in the piston 10. Depending on the position of the second valve body 82, the second chamber 46 communicates with the chamber 86 via an opening 88. The second valve body 82 and the spring 84 are disposed in the chamber 86. The first valve body 81 is provided in the opening 50. Depending on the position of the first valve body 81, the opening 50 is opened or closed. The two valve bodies 81, 82 are joined mechanically to one another, for instance via the connection 83. The result is a coupling between the two valve bodies 81, 82 in such a way that when the first valve body 81 opens the opening 50, the second valve body 82 simultaneously blocks the opening 88. Conversely, if the opening 88 is opened, then the opening 50 is simultaneously closed. The spring 84 acts upon the valve bodies 81, 82, tending to close the opening 88 and opens the opening 50.

If the pressure in the work chamber 4 is greater than the pressure in the second work chamber 6, then the chambers 44, 46 communicate with the second work chamber 6, and the cylinder operates as explained above for the first exemplary embodiment and as shown in FIG. 1. The opening 88 is closed and thus is out of operation.

If the pressure of the pressure fluid in the second work chamber 6 is greater than the pressure of the pressure fluid in the first work chamber 4, then the pressure of the second work chamber 6 initially is propagated, possibly as far as the opening 88. The pressure in the opening 88 is thus greater than in the chamber 86, and therefore the second valve body 82 is lifted from its valve seat counter to the force of the relatively weak spring 84, causing the opening 88 to open. At the same time, the opening 50 is necessarily closed. As a result, the chambers 44, 46 in this case communicate with the first work chamber 4. The control chamber 30 and the third chamber 48 also communicate with the first work chamber 4. The control slide 20 is thus surrounded on all sides by the pressure of the first work chamber 4, and so it is statically balanced, at least in the actuation direction. This means that in the event that the pressure in the second work chamber 6 is greater than in the first work chamber 4, then no additional force acts upon the control slide 20 via the effective face 70. In the exemplary embodiment shown in FIG. 4, the additional force arises only whenever the pressure fluid flows out of the first work chamber 4 into the second work chamber 6.

In order not to hinder the mobility of the control slide 20, the valve assembly 80 is embodied such that whenever the first valve body 81 uncovers the opening 50, the pressure fluid can flow through the opening 50 in both directions. This is also true if the opening 50 is closed but the opening 88 in turn is opened. In that case, the pressure fluid can flow through the opening 88 in both directions. This can be most simply attained if the two valve bodies 81, 82, as shown in FIG. 4, are coupled together with the aid of the connection 83, by way of example.

With so-called single-tube shock absorbers, the pressure fluid often flows in both directions through a single flow connection inside the piston. Embodying the cylinder according to the invention as shown by way of example in FIG. 4 is therefore especially suitable for so-called single-tube shock absorbers.

The work chambers 4, 6 of the cylinder can communicate not only via the flow connection 2 but also via one further flow connection 90, or more than one further flow connection. Since the further flow connection 90 is not absolutely necessary in the cylinder embodied according to the invention, the further flow connection 90 is shown in dashed lines in the drawing. A further control device 92 in the course of the further flow connection 90 may be provided.

In the drawing, the piston 10 is shown as if it were in one piece. To enable mounting the control device 18, in particular, one skilled in the art may embody the piston 10 as arbitrarily divisible.

The jacket tube 8 may for instance be connected to a vehicle body or axle. Correspondingly, the piston rod 12 is connected to the axle or the body of the vehicle. The cylinder according to the invention can thus for instance be a vehicle shock absorber.

The resultant flow force acting upon the control slide 2 normally actuates the control slide 20 in the closing direction. The exemplary embodiment shown in FIG. 1, for example, is therefore such that to compensate for the flow force, the additional force acts in the opening direction, that is, in the direction of the arrow 42. In the exemplary embodiment shown in FIG. 1, for example, however, it is also possible for it to be embodied such that the additional force acts in the closing direction, if the pressure fluid is flowing out of the first work chamber 4 into the second work chamber 6. This is attained for instance by providing that the second chamber 46 is connected directly to the first work chamber 4 by an opening not shown in the drawing, and that the opening 52 in turn is closed. Since it is readily possible for one skilled in the art to embody this variant no further illustration of it has been provided in the drawing.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. A cylinder having a piston, a jacket tube, and two work chambers each containing a pressure fluid, with a flow connection between the two work chambers, said piston defining a bore therein a throttle cross section in the course of said flow connection which is controllable with the aid of an electromagnetically actuatable control slide for generating an additional force, the control slide (20) having an effective face (70), said face having a width substantially equal to the diameter of said bore and extending transversely to the actuation direction of the control slide (20) which separates a first chamber (30), containing a higher pressure of the pressure fluid flowing in at the throttle cross section (16), from a second chamber (46), containing a lower pressure of the pressure fluid flowing in from the throttle cross section (16), wherein the pressure in the first chamber (30) containing the higher pressure acts in the opening direction upon a side of the effective face (70) of the control slide oriented toward this first chamber (30), and that the pressure in the second chamber (46) containing the lower pressure acts in the closing direction upon a side of the effective face (70) oriented toward the second chamber (46), said higher and lower pressures acting on both said sides of the effective face operate to create an additional force on said control slide.

2. A cylinder as defined by claim 1, in which the additional force on said effective face (70) at least partially compensates for flow forces acting upon the control slide (20).

3. A cylinder as defined by claim 2, in which the additional force on said effective face (70) acts upon the control slide (20) in the opening direction.

4. A cylinder as defined by claim 3, which includes a valve assembly (80) which controls the additional force on said control slide as a function of a flow direction.

5. A cylinder as defined by claim 1, in which the additional force on said effective face (70) acts upon the control slide (20) in the opening direction.

6. A cylinder as defined by claim 5, which includes a valve assembly (80) which controls the additional force on said control slide as a function of a flow direction.

7. A cylinder as defined by claim 2, which includes a valve assembly (80) which controls the additional force on said control slide as a function of a flow direction.

8. A cylinder as defined by claim 1, which includes a valve assembly (80) which controls the additional force on said control slide as a function of a flow direction.

* * * * *